No. 741,125.

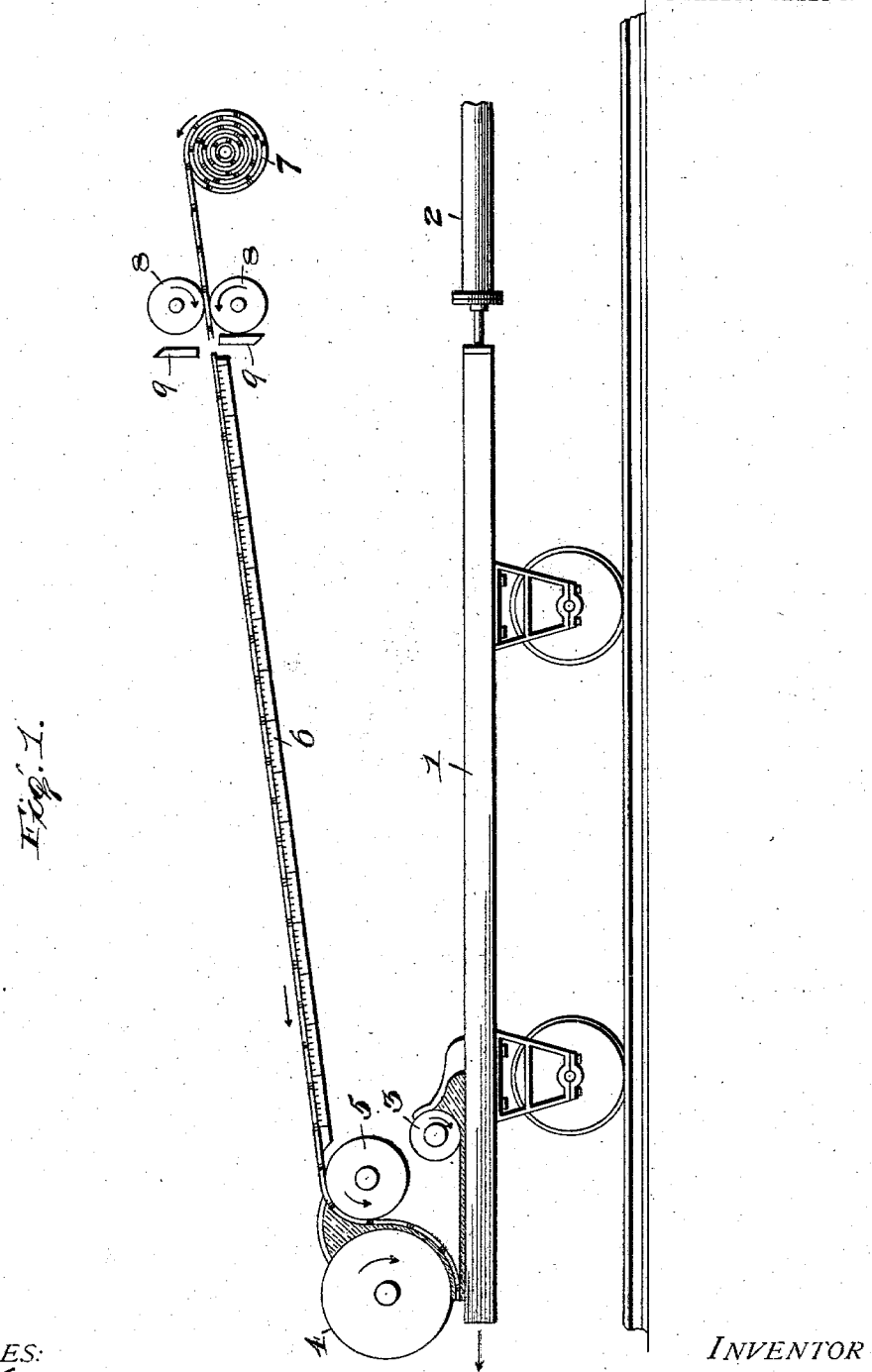

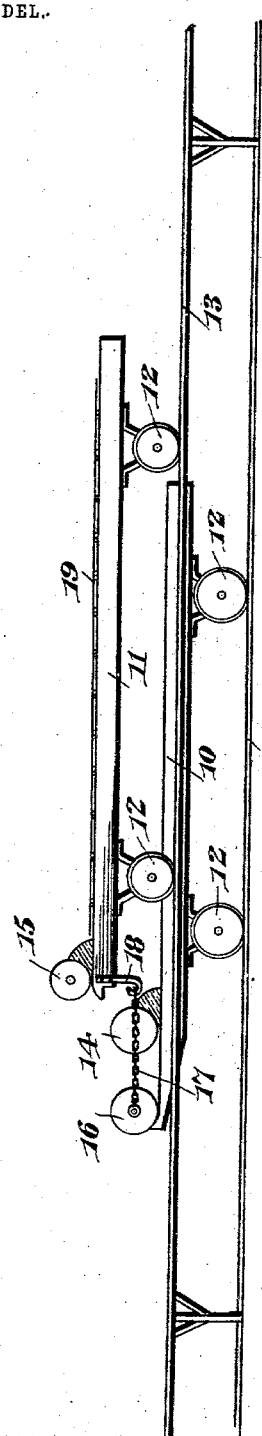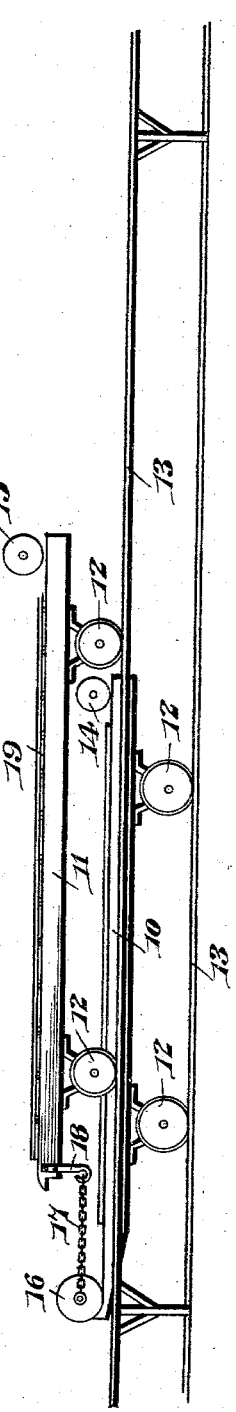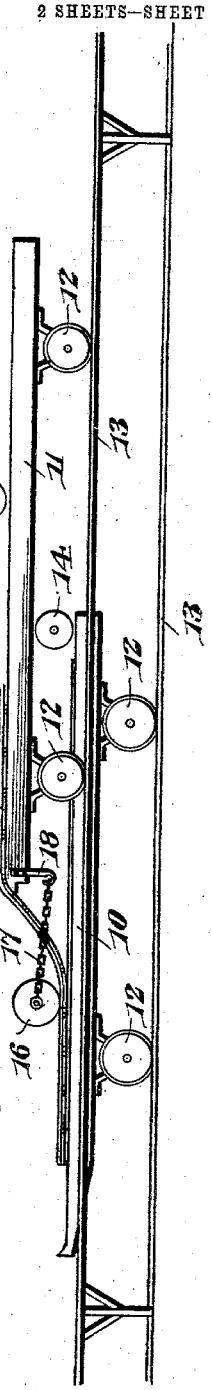

Patented October 13, 1903.

UNITED STATES PATENT OFFICE.

NICKLAS FRANZEN, OF PORT ALLEGANY, PENNSYLVANIA.

METHOD OF MANUFACTURING WIRE-GLASS.

SPECIFICATION forming part of Letters Patent No. 741,125, dated October 13, 1903.

Application filed June 17, 1903. Serial No. 161,901. (No specimens.)

*To all whom it may concern:*

Be it known that I, NICKLAS FRANZEN, a citizen of the United States, residing at Port Allegany, county of McKean, and State of Pennsylvania, have invented certain new and useful Improvements in the Method of Manufacturing Wire-Glass, of which the following is a specification.

This invention relates to a novel method of manufacturing that class of glass having wire embedded therein and commercially known as "wire-glass."

There have been a number of methods proposed; but the one that has proven the most practicable was originally devised and patented by Philip Arbogast in 1879. Broadly stated, this method consists in forming a sheet of glass, applying to one face thereof wire-netting, and placing thereupon another batch of glass which is formed into a layer and covers the wires, these layers becoming amalgamated or welded into a single structural sheet with the wire incorporated therein. This method, originated by Arbogast, has been performed in a slightly-different manner by rolling out the first sheet or layer and applying to the upper face thereof the wire-netting. After such formation a batch of "metal" or molten glass is placed upon the upper face of the layer having the wire, and this batch is then rolled to form the second layer, the resulting product being, as in the original case, a single sheet with the incorporated wire.

The method above indicated has been practiced in this and foreign countries with considerable success; but there are objectionable features in connection therewith which it has been impossible to overcome. In the first place the first sheet or layer being comparatively thin cools considerably before the application of the second batch thereto, and the hotter mass of metal coming into contact with the cooler layer sets up strains in the latter which often cause checks and imperfections. Moreover, the highly-heated mass burns the wire to a greater or less degree. A more serious objection, however, is caused by the formation in the finished sheet of a defect commercially known as "black ball." This is a circular stained appearance from twenty to forty inches in diameter that is plainly visible and detracts greatly from the appearance of the sheet, besides reducing its marketable value to a very considerable degree.

The object of the present invention is to provide a new method which will obviate these various defects in the finished article, said method, furthermore, permitting the manufacture of larger sheets with rapidity, so that they will have a comparatively even temperature throughout their area and be more susceptible to annealing. Heretofore it has been necessary to manufacture the sheets slowly, and the result has been that such sheets were rather cool at their front ends, though hot at their rear ends, a very undesirable feature, as is well known to those skilled in the art.

In the present embodiments of the invention the two sheets or layers are formed separately and simultaneously and are continuously united at a point or line substantially equidistant from the places of formation. The result is that said layers are of substantially equal temperature, their conditions are practically the same, and the resultant product is of a high degree of excellence.

In order that the nature of the invention may be more readily understood, there are illustrated in a partially diagrammatic manner two different forms of apparatus, showing slightly-diversified manners of carrying the method into effect. No claims are herein made to the apparatus, that indicated in Figure 1 being described in detail and claimed in a copending application, Serial No. 164,495.

In the drawings, Fig. 1 is a sectional view of a preferred form of means for carrying this invention into effect. Figs. 2, 3, and 4 are views of a different form of apparatus, showing the parts thereof in different relations and illustrating the different steps in the formation of the wire-glass.

Referring first to Fig. 1, a movable casting-table 1 is illustrated, which can be reciprocated by any suitable means—as, for instance, a hydraulic motor 2. Located above the table is a primary sheet-forming roller 3, that is revoluble, but relatively stationary with respect to the table. This roller is placed above the table a distance equal to the thickness of the first layer or sheet. Located in rear of the roller 3 is a uniting-roller 4, that is also revoluble, but held against longitudinal movement with the table. The distance between this roller and the table is equal to the thickness of the finished sheet of glass. Arranged in rear of the roller 4 and some distance above the table is a secondary sheet-forming roller 5, revoluble with the roller 4 and being spaced therefrom a distance equal to the thickness of the secondary layer or sheet. A suitable inclined chute 6 is located above the table 1 and extends to a point above the roller 5. In rear of this chute is placed the wire-reel 7, and interposed between the rear end of the chute and the reel are flattening and feed rollers 8, suitable cutters or shears 9 being disposed between the rollers 8 and the chute.

In the manufacture of a sheet of glass the wire-netting is first unwound from the reel, being passed between the rollers 8, where the twists are flattened, so that there are no air-interstices formed therein. Said flattened wire thus passes on to the chute, where it is cut off at the desired length by the shears 9, and the foremost end is entered between the rollers 4 and 5. The mechanism is then ready to receive the metal. Two batches of molten glass are simultaneously and respectively teemed between the rollers 4 and 5 and upon the casting-table in rear of the roller 3. At the same time the machine is started, or, in other words, the table is advanced and the rollers revolved. Consequently the two sheets or layers of glass will be simultaneously formed at separate points, the primary sheet being formed between the roller 3 and the casting-table and the secondary sheet being formed between the rollers 4 and 5. The wire-netting will be embedded in the under face of the secondary sheet, as will be clearly evident. As the mechanism continues to operate the two layers will come together beneath the uniting-roller 4, and this line of uniting is located substantially equidistant from the formation of the first and second layers. Said layers passing under this uniting-roller will be thoroughly welded together and incorporated into a single sheet, with the wire located therein.

It is desired to call attention to the following advantages which this method has over those outlined in the preliminary part of the specification: In the first place the two batches of metal are kept entirely separate and do not come into contact with either of the layers, and while one of said batches does come into direct engagement with the wire-netting said netting is protected by the adjacent roller, (which is cooled in the manner illustrated in the copending application.) The two layers being separately formed and coming together at a point equidistant from their points of formation are rolled at the same speed, so that both are cooling evenly and will weld into a homogenous sheet without flaws or defects. Moreover, the formation progresses continuously without stoppage on the part of the mechanism, and the great objection—namely, black ball—is obviated in the product. Further than this, large sheets can be manufactured and made with rapidity, so that when finished they are of substantially even temperature throughout their area. This is a decided advantage for annealing purposes, the even temperature making the sheets more susceptible to the annealing operations.

A slightly-modified manner of carrying the method into effect is illustrated in Figs. 2, 3, and 4. In this instance a lower casting-table 10 and an upper casting-table 11 are employed, these tables being movably supported at different elevations by wheels 12, running on tracks 13. Revolubly located over the lower table 10 is a primary sheet-forming roller 14, which is held against longitudinal movement with the table. Another similar roller 15, constituting the secondary sheet-forming roller, is disposed above the table 11, said tables 10 and 11 being movable beneath the rollers 14 and 15. The lower table 10 carries at its front end a loose uniting-roller 16, which can be attached to the corresponding end of the upper table by a suitable chain or cable 17, said table 11 being provided with depending hooks 18. This mechanism when ready to perform the sheet-forming operation is in the relation illustrated in Fig. 2—that is to say, the casting-tables are in their rearmost positions, while the uniting-roller 16 is supported upon the front end of the lower table. A sheet of wire-netting is laid upon the upper table, and metal is then simultaneously teemed upon both tables in rear of the sheet-forming rollers 14 and 15. Immediately the tables are both moved forwardly, and the result is that two separate layers of molten glass are formed, one of these layers having the wire-netting incorporated in its under face. This step is illustrated in Fig. 3. After the formation of the separate sheets one end of the upper one is drawn down into engagement with the corresponding end of the lower layer, and the lower table 10 is held stationary, while the upper table is given a retrograde movement, the uniting-roller 16 being attached to said upper table, as illustrated in Fig. 4. This roller 16 will therefore be carried over the superposed layers, forcing them together and welding them into a homogeneous sheet. This manner of carrying out the invention is substantially the same as that above described and has all the advantages thereof, for the reason that the two layers are formed separately. No batch of metal is teemed upon one layer, and the layers, moreover, are of substantially the same temperature when brought together.

The two types of the method herein set forth are considered to be the most desirable now known; but it will of course be understood that various changes may be made without departing from the spirit or scope of the invention.

Having thus described my invention, what I claim as new, and desire to secure by Letters Patent, is—

1. That improvement in the method of manufacturing wire-glass which consists in rolling a sheet upon a table, forming a separate sheet above the table and in spaced relation to the sheet thereon, and uniting the second and the first mentioned sheets with wire interposed between them.

2. That improvement in the method of manufacturing wire-glass which consists in rolling a sheet upon a table, forming a separate sheet above the table with wire embedded in its lower face, and applying the second sheet to the first-mentioned sheet with the wired face against the same.

3. That improvement in the method of manufacturing wire-glass which consists in rolling a sheet upon a table, rolling another sheet above and in spaced relation to the sheet formed upon the table, simultaneously applying to the under face of the upper sheet, wire-netting, and finally uniting by rolling the two sheets with the wire interposed between them.

In testimony whereof I hereunto affix my signature in the presence of two witnesses.

NICKLAS FRANZEN.

Witnesses:
ERNEST G. THOMPSON,
GEORGE L. GORMAN.